(12) United States Patent
Chen et al.

(10) Patent No.: US 12,513,858 B2
(45) Date of Patent: Dec. 30, 2025

(54) 5G OUTDOOR UNIT HAVING HEAT DISSIPATION FUNCTION

(71) Applicant: ARCADYAN TECHNOLOGY CORPORATION, Hsinchu (TW)

(72) Inventors: Sheng-Chung Chen, Hsinchu (TW); Chin-Yi Wu, Hsinchu (TW); Jhih-Hao Chen, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 337 days.

(21) Appl. No.: 18/207,217

(22) Filed: Jun. 8, 2023

(65) Prior Publication Data
US 2023/0413488 A1    Dec. 21, 2023

(30) Foreign Application Priority Data
Jun. 15, 2022 (TW) ................... 111122228

(51) Int. Cl.
*H05K 7/20* (2006.01)
(52) U.S. Cl.
CPC .............................. *H05K 7/20409* (2013.01)
(58) Field of Classification Search
CPC ... H04W 84/042; H04W 16/14; H04W 84/12; H04W 88/06; H04W 48/18; H04W 88/08; H04W 88/085; H04W 88/10; H04W 16/26; H04W 72/0453; H04W 88/04; H04W 92/02; H04W 36/04; H04W 36/08; H04W 56/001; H04L 67/12; H04L 12/2801; H04L 5/14; H04L 12/2803; H04L 12/2838; H04L 43/16; H04L 12/2869; H04L 12/2898; H04L 27/0006; H04L 27/26; H04L 27/2637; H04L 41/0806; H04L 41/5003; H04L 43/10; H04L 47/821; H05K 7/20409; H05K 7/20136; H05K 7/20336; H05K 7/2039; H05K 5/0217; H05K 5/0247; H05K 5/06; H05K 5/13; H05K 7/202; H05K 7/20209; H05K 7/2029; H05K 9/0024; H05K 7/20009

See application file for complete search history.

(56) References Cited

U.S. PATENT DOCUMENTS

| 11,877,842 B1* | 1/2024 | Filipovic ............... A61B 3/0033 |
| 2022/0039205 A1* | 2/2022 | Donthireddy ........ H05K 5/0217 |
| 2022/0167531 A1* | 5/2022 | Wei ..................... H05K 7/20409 |
| 2023/0408080 A1* | 12/2023 | Gelten ................ F21V 33/0052 |
| 2024/0164061 A1* | 5/2024 | MacManus .......... H05K 7/2029 |
| 2025/0023222 A1* | 1/2025 | Brown .................. H01Q 21/28 |

* cited by examiner

Primary Examiner — Golam Sorowar

(57) ABSTRACT

A 5G outdoor unit having a heat dissipation function includes a main body and a support frame. The main body includes a housing, a cover, and an antenna, the cover is mounted on one side of the housing, and the antenna is disposed on an inner side of the cover. The support frame includes a first side plate, a second side plate, and a plurality of heat dissipation fins. The first side plate is mounted on an outer side of the cover, the fins are arranged between the first side plate and the second side plate at intervals, and a channel is formed between the two adjacent heat dissipation fins. As such, the main body and the support frame are two separate elements. The volume of the main body is reduced, and the weight of the main body is less.

8 Claims, 16 Drawing Sheets

5G OUTDOOR UNIT HAVING HEAT DISSIPATION FUNCTION

CROSS-REFERENCE TO RELATED APPLICATION

This application claims the priority of Taiwanese patent application No. 111122228, filed on Jun. 15, 2022, which is incorporated herewith by reference.

BACKGROUND OF THE INVENTION

1. Field of the Invention

The present invention generally relates to an outdoor unit of microwave communication equipment, and more particularly to a 5G outdoor unit with a heat dissipation function.

2. The Prior Arts

A microwave communication device includes an outdoor unit (ODU) and an indoor unit (IDU). The outdoor unit is installed outdoors and can wirelessly receive microwave signals from the outside and complete the frequency conversion and amplification to generate stronger microwave signals. The indoor unit receives the microwave signal from the outdoor unit through a cable and further modulates, demodulates, and processes the microwave signal.

The miniaturization of outdoor units is a trend. For example, in 5G outdoor units, a small antenna is placed on the inside of the cover and inside the housing. However, the power consumption of 5G outdoor units continues to increase. Therefore, the heat dissipation effect directly impacts the operational efficiency of the 5G outdoor unit. Since the 5G outdoor unit faces a harsh outdoor environment, waterproof and dustproof must be considered, and it is not suitable to open heat dissipation holes on the cover of the 5G outdoor unit. A general solution is to dispose a plurality of sheets on the outside of the cover. The support frame is integrally formed with the sheets, and the support frame is fixed on the lamp post, the wall or the antenna tower.

However, the heat dissipation effect provided by the sheets is not ideal, resulting in a decrease in the operation performance of the conventional 5G outdoor unit. Furthermore, the cover of the conventional 5G outdoor unit and the sheets are integrally formed, resulting in the problems of the conventional 5G outdoor unit being bulky and heavy, which cannot be grasped by a user with one hand and is difficult to install.

In addition, the cover and the support frame are integrally formed components. In order to be used in different environments, a new set of molds must be redeveloped for the cover and the support frame, which results in further cost.

SUMMARY OF THE INVENTION

A primary objective of the present invention is to provide a 5G outdoor unit having a heat dissipation function, wherein the main body and the support frame can be separated and are easy to assemble with one hand.

Another objective of the present invention is to provide a 5G outdoor unit having a heat dissipation function, which can provide good heat dissipation through the support frame.

Yet another objective of the present invention is to provide a 5G outdoor unit having a heat dissipation function, which can separate the cover from the support frame and greatly reduce the cost of mold design.

In order to achieve the aforementioned objectives, the present invention provides a 5G outdoor unit having a heat dissipation function, which comprises a main body and a support frame. The main body comprises a housing, a cover, and an antenna; the cover is disposed on one side of the housing, and the antenna is disposed on the inner side of the cover. The support frame comprises a first side plate, a second side plate, and a plurality of heat dissipation fins; the first side plate is disposed on the outer side of the cover; the heat dissipation fins are disposed between the first side plate and the second side plate at intervals, with a channel formed between two adjacent heat dissipation fins.

In a preferred embodiment, the first side plate has at least one groove, the cover has at least one protrusion, and the at least one protrusion is disposed in the at least one groove.

In a preferred embodiment, the first side plate has at least one protrusion, the cover has at least one groove, and the at least one protrusion is disposed in the at least one groove.

In a preferred embodiment, the support frame comprises a plurality of heat dissipation blocks, and the heat dissipation blocks are disposed on at least one side of the heat dissipation fins at intervals.

In a preferred embodiment, a through hole is formed between each heat dissipation block and each heat dissipation fin.

In a preferred embodiment, an axis of the through hole is parallel to a flow direction of airflow through the channel.

In a preferred embodiment, the second side plate defines at least one fixing hole, and at least one fastener passes through the at least one fixing hole and fixes the second side plate to an external device.

In a preferred embodiment, each heat dissipation fin defines a plurality of via holes.

In a preferred embodiment, the surface of each heat dissipation fin has a layer of heat dissipation material.

In a preferred embodiment, the surface of each heat dissipation fin has a surface roughness.

The effect of the present invention is that the main body and the support frame are two separate independent components so that the main body has a smaller volume and less weight; during installation, the support frame can be first fixed on external devices such as lamp posts, walls, or antenna towers, and then hold the main body with one hand and assemble the cover with the support frame, which is easy to accomplish.

Furthermore, the support frame can provide a good heat dissipation effect and improve the operation performance of the 5G outdoor unit of the present invention.

In addition, the cover and the support frame are two separate independent components, and the shape of the support frame only needs to be adjusted by a new mold, and the shape of the cover does not need any adjustment, which greatly reduces the cost of mold design.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
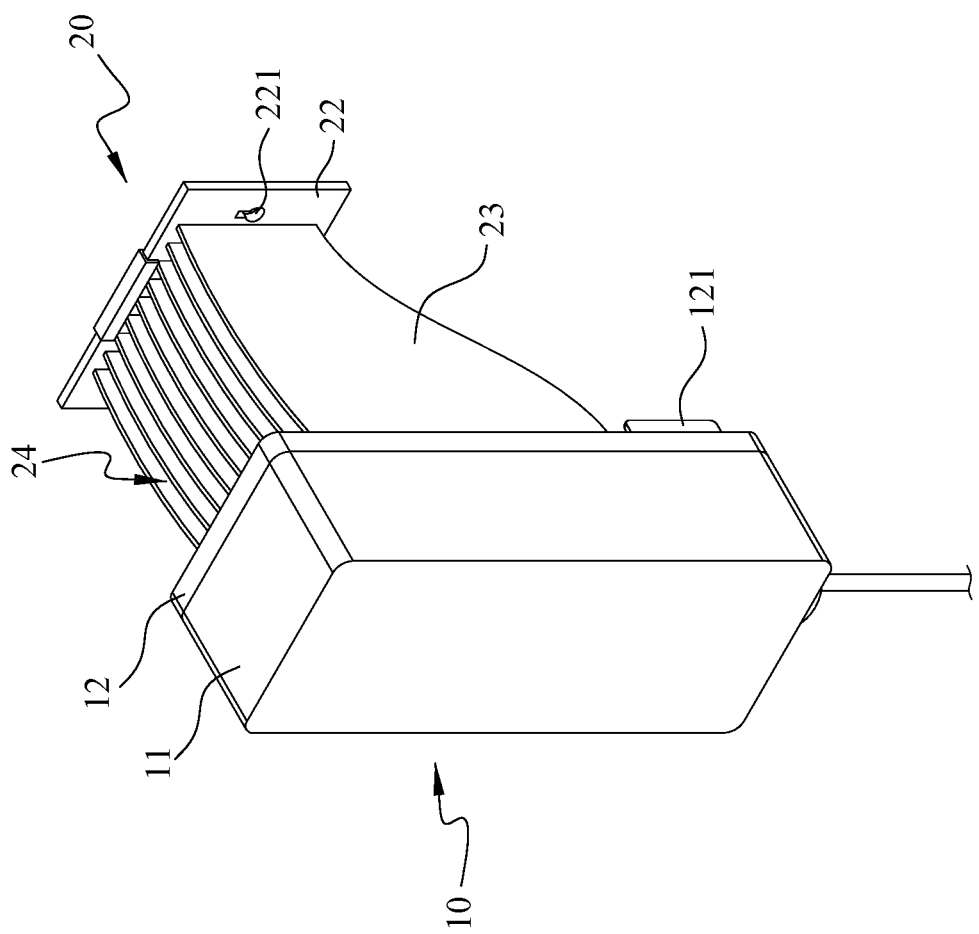
FIG. 1 is a perspective view of a first embodiment of the present invention.
Figure 2:
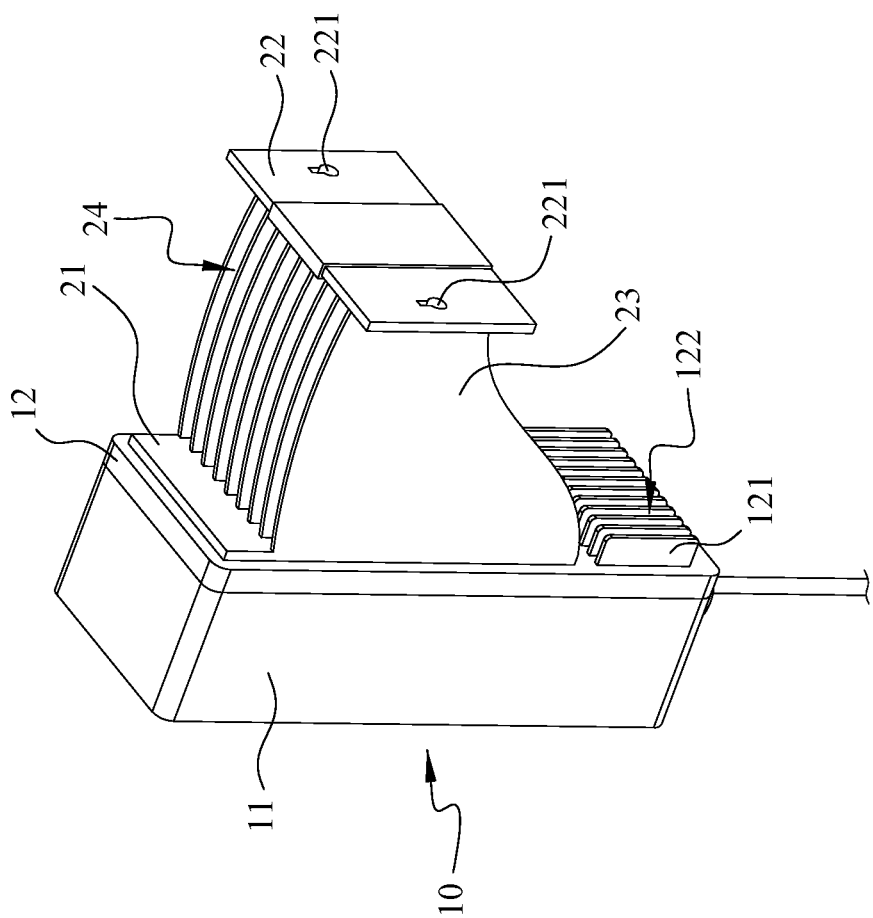
FIG. 2 is a perspective view of the first embodiment of the present invention from another perspective.
Figure 3:
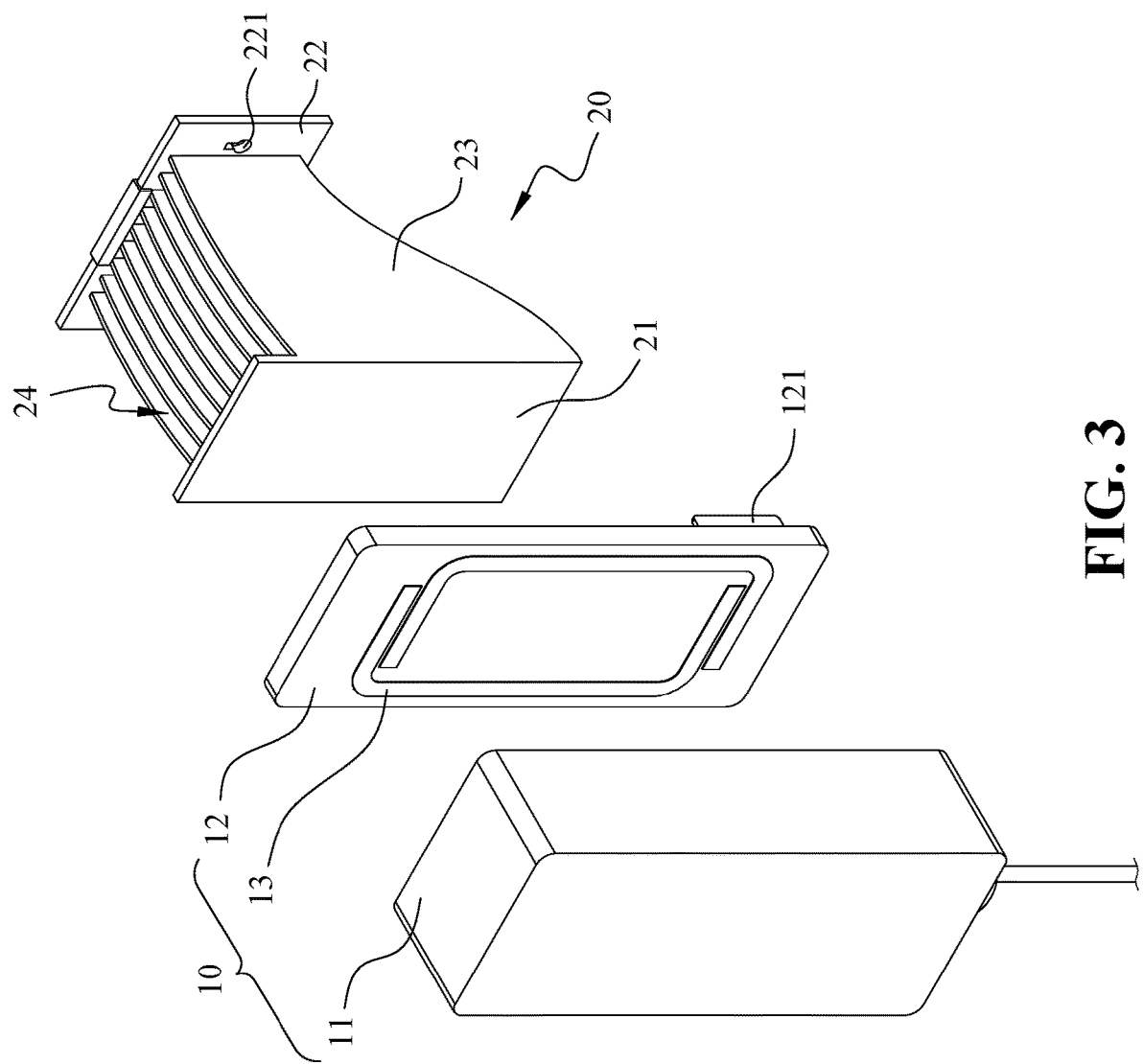
FIG. 3 is an exploded view of the first embodiment of the present invention.
Figure 4:
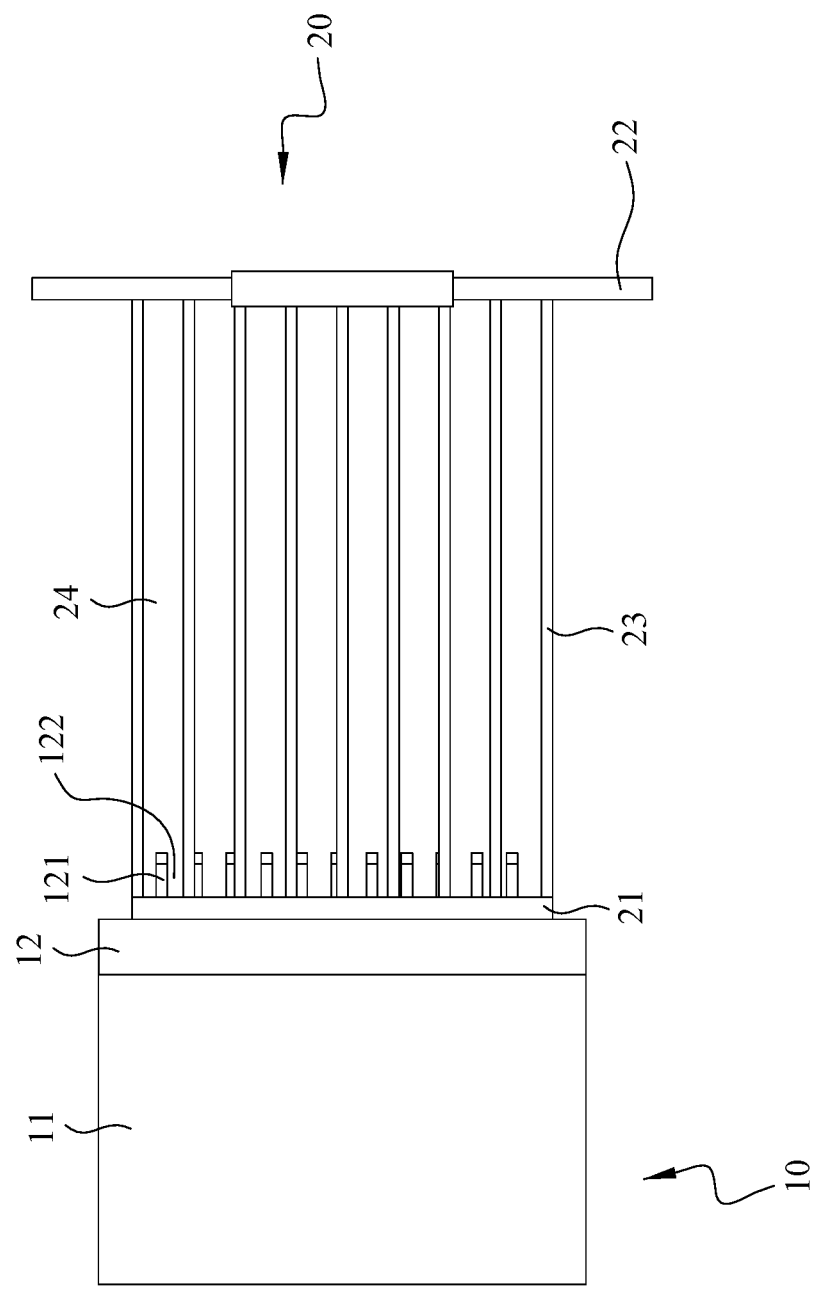
FIG. 4 is a planar view of the first embodiment of the present invention.

The accompanying drawings are included to provide a further understanding of the invention and are incorporated in and constitute a part of this specification. The drawings illustrate embodiments of the invention and, together with the description, serve to explain the principles of the invention.

Refer to FIG. 1 to FIG. 4, which are a perspective view of the first embodiment of the present invention, a perspective view from another angle, an exploded view, and a top planar view, respectively. As shown in FIG. 1 to FIG. 4, the present invention provides a 5G outdoor unit with a heat dissipation function, which includes a main body 10 and a support frame 20. The main body 10 includes a housing 11, a cover 12, and an antenna 13. The cover 12 is disposed on one side of the housing 11. The antenna 13 is disposed inside the cover 12. The support frame 20 includes a first side plate 21, a second side plate 22 on an opposite side of the first side plate 21, and a plurality of heat dissipation fins 23. The first side plate 21 is disposed on the outer side of the cover 12, and the heat dissipation fins 23 are disposed on the first side plate 21 and the second side plate 22 at intervals. Each of the heat dissipation fins 23 has two edges connected respectively to the first side plate 21 and the second side plate 22. A channel 24 is formed between two adjacent heat dissipation fins 23.

Figure 5:
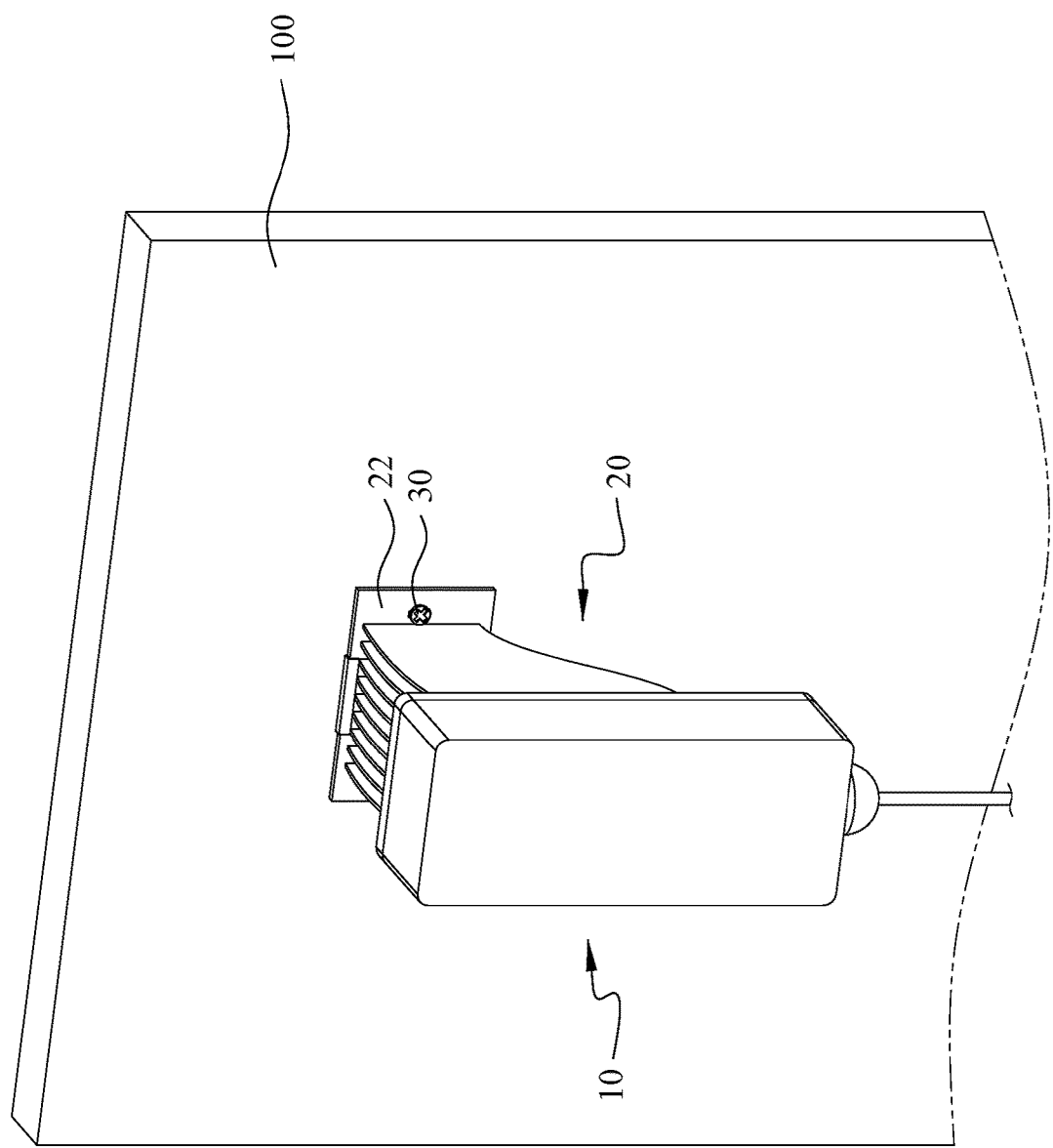
FIG. 5 is a schematic view of the first embodiment of the present invention installed on a wall.

FIG. 5 is a schematic view of the first embodiment of the present invention installed on a wall. As shown in FIG. 5, the second side plate 22 is fixed on an external device 100, wherein the external device 100 is a wall. More specifically, as shown in FIG. 1, FIG. 2, FIG. 3, and FIG. 5, the second side plate 22 defines two fixing holes 221, and two fasteners 30 pass through the two fixing holes 221 respectively and fix the second side plate 22 on the wall. In some embodiments, the second side panel 22 can be fixed on a lamp post, an antenna tower, or other external device 100 that may be provided with a 5G outdoor unit.

Moreover, because the main body 10 and the support frame 20 are two separate independent components, the main body 10 is not restricted by the support frame 20 during manufacture, so the main body 10 can be reduced in size and weight. When the 5G outdoor unit of the present invention is installed on the external device 100, the second side plate 22 of the support frame 20 is fixed onto the external device 100, such as a lamp post, a wall, or an antenna tower first, and then the user can hold the main body 10 with one hand and engage the outer side of the cover 12 with the first side plate 21 of the support frame 20 for easy assembly.

Furthermore, since the antenna 13 is disposed on the inner side of the cover 12, the heat generated when the antenna 13 operates will be directly absorbed by the cover 12. The cover 12 transmits the heat to the first side plate 21, and the first side plate 21 transmits the heat to the heat dissipation fins 23. Because the heat dissipation fins 23 are arranged in a spaced and intermittent manner, a plurality of channels 24 can be formed between the heat dissipation fins 23, thereby improving the form factor and radiation area, and increasing the efficiency of heat transfer. When the air flows through the channels 24, the air is heated to generate a density difference, which enhances the convection effect, thereby improving the heat dissipation efficiency. Therefore, the 5G outdoor unit of the present invention can provide good heat dissipation through the support frame 20 while the volume of the main body 10 is reduced, thereby improving the operation performance of the 5G outdoor unit of the present invention.

In addition, the cover 12 and the support frame 20 are two separate independent components. In order to be applied in different environments, as long as a new set of molds is developed for the support frame 20, the shape of the support frame 20 can be adjusted by the new mold. The shape of the main body 10 does not need any adjustment, which greatly reduces the cost of mold design.

Preferably, as shown in FIG. 1 to FIG. 4, a plurality of sheets 121 are arranged on the outer side of the cover 12 at intervals, and a groove 122 is formed between two adjacent sheets 121. The sheets 121 can increase the heat dissipation area, and the air can flow through the grooves 122, thereby providing the cover 12 with a good heat dissipation effect.

Preferably, the cover 12 and the support frame 20 are made of metal, such as stainless steel or aluminum alloy. Metal has good thermal conductivity, so the cover 12 can quickly absorb the heat generated when the antenna 13 operates, and the support frame 20 can quickly receive the heat from the cover 12 to improve the heat dissipation efficiency.

Figure 6:
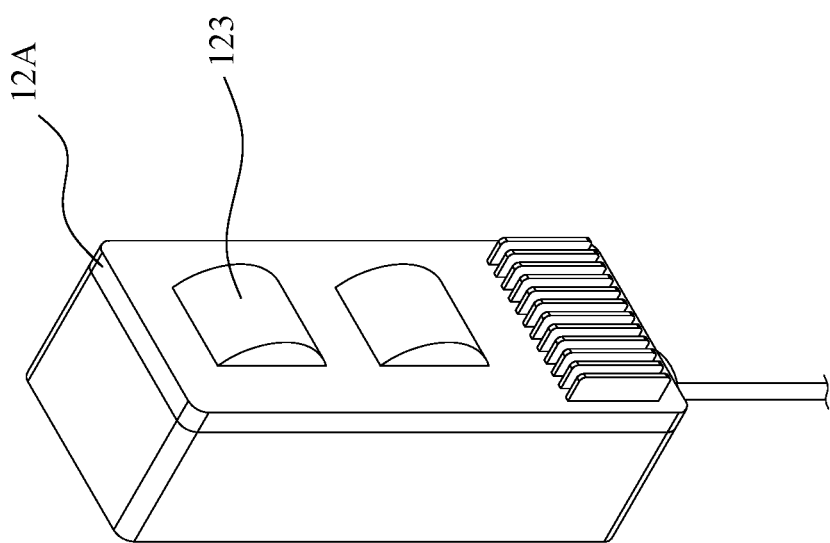
FIG. 6 is a perspective view of the main body of the second embodiment of the present invention.
Figure 7:
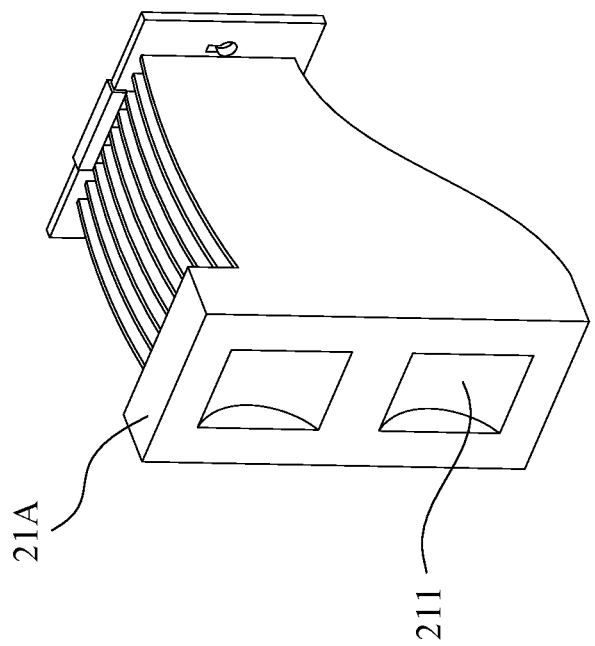
FIG. 7 is a perspective view of the support frame according to a second embodiment of the present invention.
Figure 8:
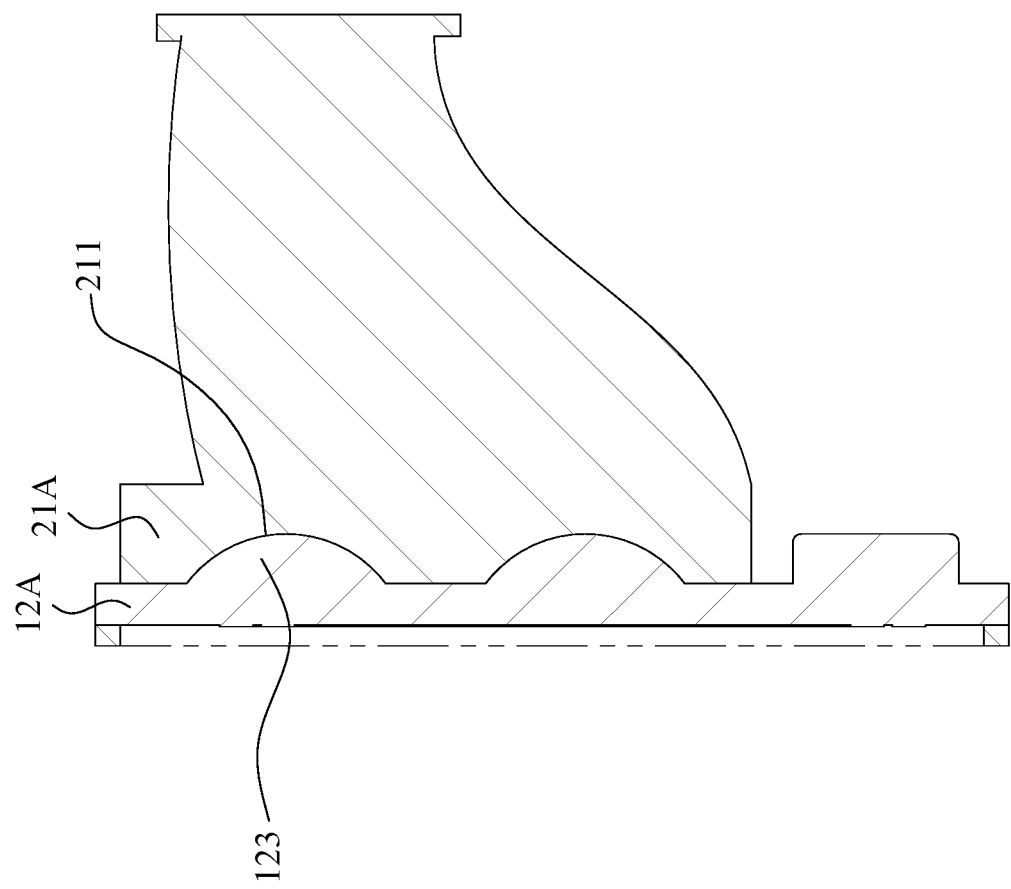
FIG. 8 is a cross-sectional view of the second embodiment of the present invention.

FIG. 6 is a perspective view of a main body 10A according to a second embodiment of the present invention, FIG. 7 is a perspective view of a support frame 20A according to the second embodiment of the present invention, and FIG. 8 is a cross-sectional view of the second embodiment of the present invention. As shown in FIGS. 6 to 8, the difference between the second embodiment and the first embodiment is that the first side plate 21A has two grooves 211, the cover 12A has two protrusions 123, and the two protrusions 123 are respectively disposed in the two grooves 211. Thereby, the two protrusions 123 and the two grooves 211 can greatly increase the contact area between the cover 12A and the first side plate 21A, thereby increasing the heat conduction efficiency of the cover 12A, transferring heat to the first side plate 21A, and improving the heat dissipation efficiency.

Figure 9:
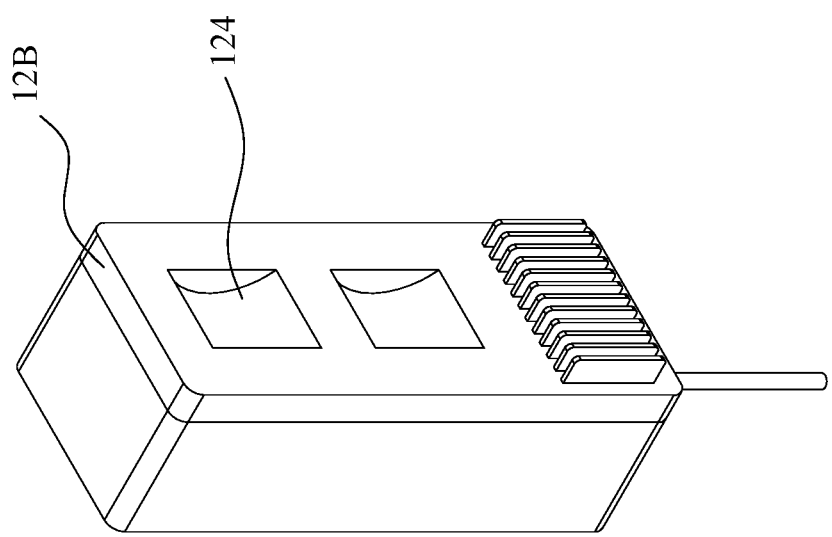
FIG. 9 is a perspective view of the main body of a third embodiment of the present invention.
Figure 10:
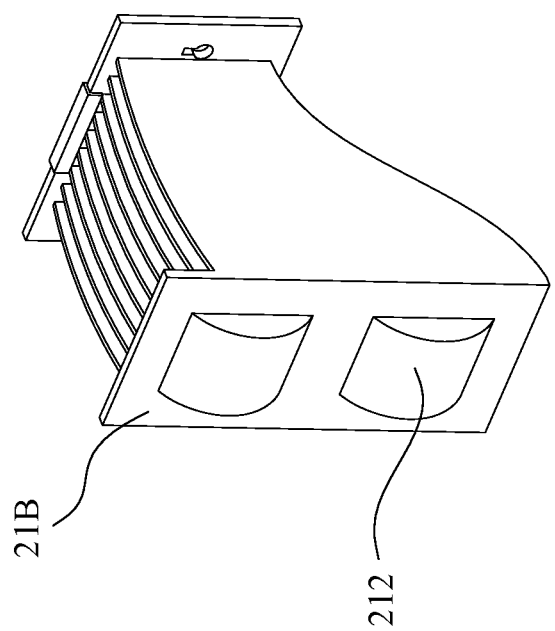
FIG. 10 is a perspective view of the support frame according to the third embodiment of the present invention.
Figure 11:
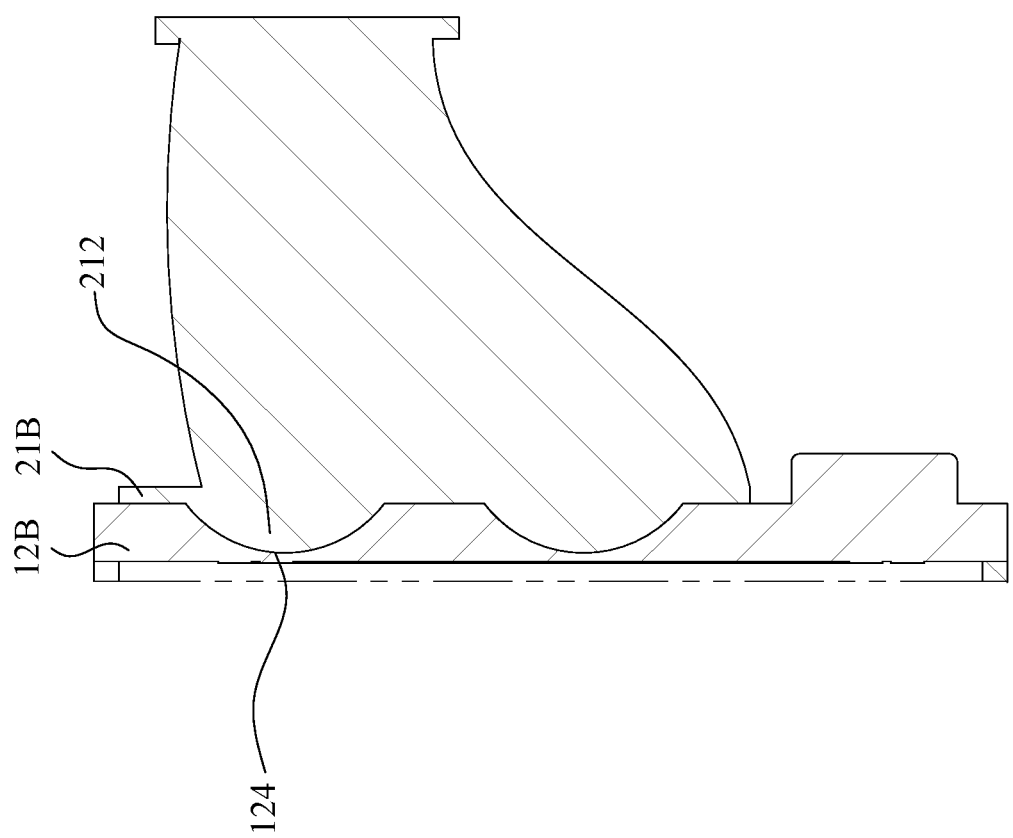
FIG. 11 is a cross-sectional view of the third embodiment of the present invention.

FIG. 9 is a perspective view of a main body 10B according to a third embodiment of the present invention, FIG. 10 is a perspective view of a support frame 20B according to the third embodiment of the present invention, and FIG. 11 is a cross-sectional view of the third embodiment of the present invention. As shown in FIG. 9 to FIG. 11, the difference between the third embodiment and the second embodiment is that the first side plate 21B has two protrusions 212, the cover 12B has two grooves 124, and the two protrusions 212 are respectively disposed in the two grooves 124.

Figure 12:
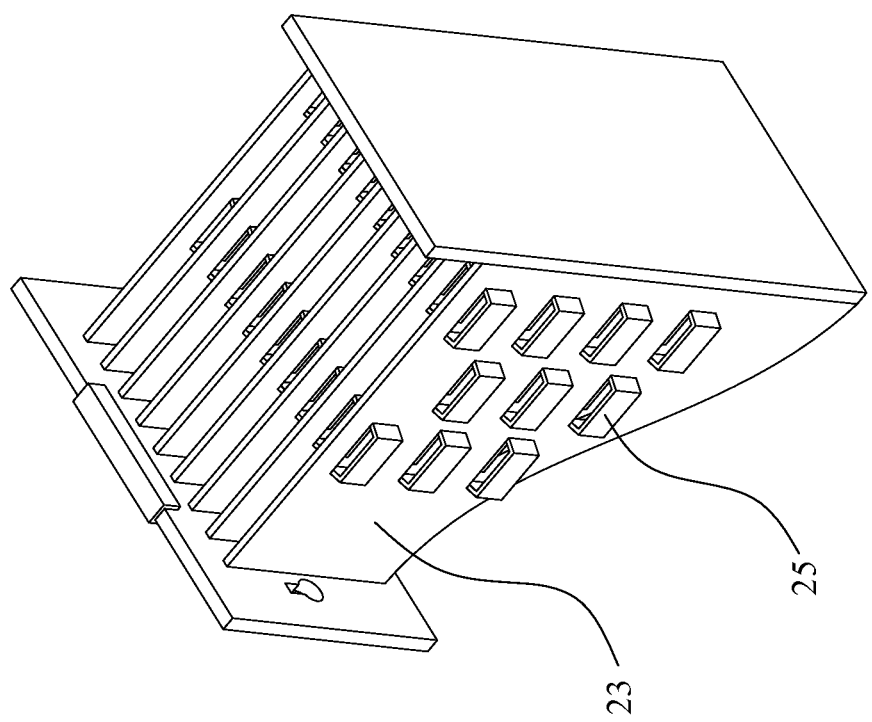
FIG. 12 is a perspective view of the support frame according to a fourth embodiment of the present invention.
Figure 13:
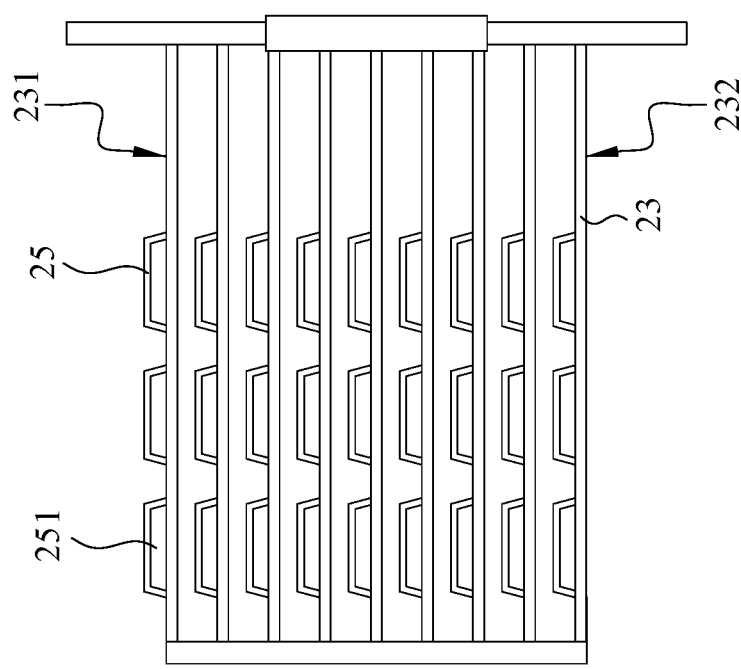
FIG. 13 is a planar view of the support frame of the fourth embodiment of the present invention.

FIG. 12 is a perspective view of a support frame 20C according to a fourth embodiment of the present invention, and FIG. 13 is a top planar view of the support frame 20C according to the fourth embodiment of the present invention. As shown in FIGS. 12 and 13, the difference between the fourth embodiment and the first embodiment is that the support frame 20C includes a plurality of heat dissipation blocks 25, and the heat dissipation blocks 25 are disposed on one side of the heat dissipation fins 23 at intervals. Each heat dissipation fin 23 has a plurality of the heat dissipation blocks 25 protruded from the surface. As such, each heat dissipation block 25 can increase the heat dissipation area, and at the same time, there is enough space between the heat dissipation blocks 25 for air to flow through, thereby improving the heat dissipation efficiency.

As shown in FIG. 12 and FIG. 13, in the fourth embodiment, the heat dissipation blocks 25 are disposed on a first side 231 of the heat dissipation fins 23 at intervals. In some embodiments, the heat dissipation blocks 25 may also be disposed on a second side 232 of the heat dissipation fins 23 at intervals. The above two configurations have the same heat dissipation efficiency.

In some embodiments, the heat dissipation blocks 25 may also be disposed on the first side 231 and the second side 232 of the heat dissipation fins 23 at intervals. Compared with the fourth embodiment, the number of heat dissipation blocks 25 in the present embodiment is larger, the heat dissipation area is larger, and the heat dissipation efficiency is higher; however, the following disadvantages include: the overall volume of the present embodiment is larger, the weight is heavier, and the manufacturing cost is higher.

As shown in FIG. 12 and FIG. 13, in the fourth embodiment, a through hole 251 is formed in each heat dissipation block 25 between each heat dissipation block 25 and the surface of each heat dissipation fin 23. The through hole is running in parallel with the surface of the heat dissipation fin 23. When the air passes through the through holes 251, the inner side surface of each heat dissipation block 25 and a small area of the surface of each heat dissipation fin 23 can be in contact with the air. The heat dissipation area is greatly increased, thereby improving the heat dissipation efficiency.

Preferably, an axis of the through hole 251 is parallel to a flow direction in which the air flows through the channel 24. As such, the air can pass through the through holes 251 in a straight line during passing through the channel 24, without changing the flow direction, thereby improving the heat dissipation efficiency.

Figure 14:
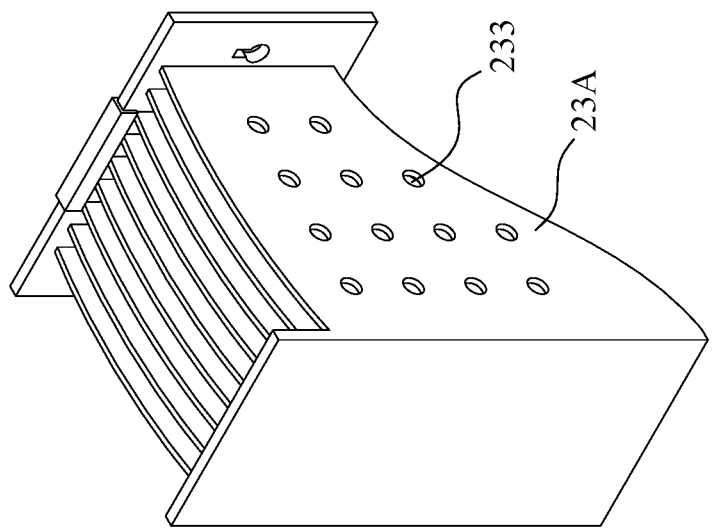
FIG. 14 is a perspective view of the support frame according to a fifth embodiment of the present invention.

FIG. 14 is a perspective view of a support frame 20D according to the fifth embodiment of the present invention. As shown in FIG. 14, the difference between the fifth embodiment and the first embodiment is that each heat dissipation fin 23A has a plurality of via holes 233. Thereby, the via holes 233 can increase the heat dissipation area of the heat dissipation fin 23A and improve the heat dissipation efficiency.

Figure 15:
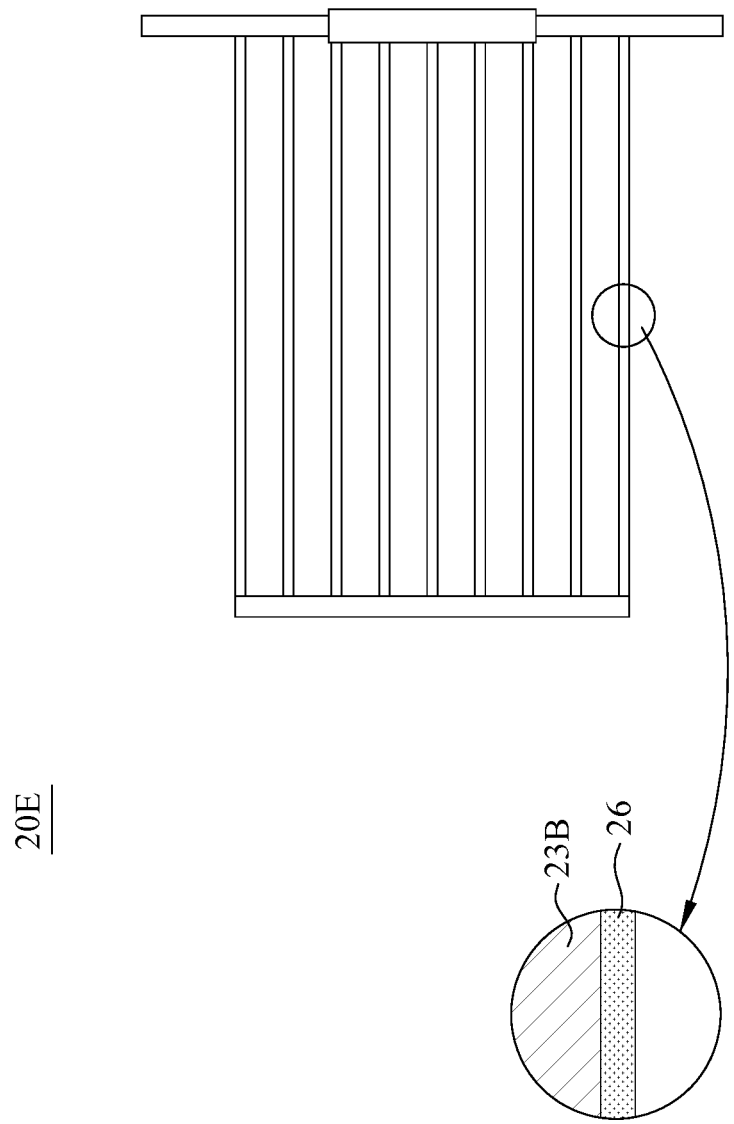
FIG. 15 is a schematic view of the support frame of a sixth embodiment of the present invention.

FIG. 15 is a schematic view of a support frame 20E according to a sixth embodiment of the present invention. As shown in FIG. 15, the difference between the sixth embodiment and the first embodiment is that each heat dissipation fin 23B has a layer of heat dissipation material 26 on the surface to increase dissipation efficiency. Heat dissipation material 26 can be thermal adhesive, thermal paste, thermal pads, or heat dissipation films, which may enhance heat dissipation efficiency.

Figure 16:
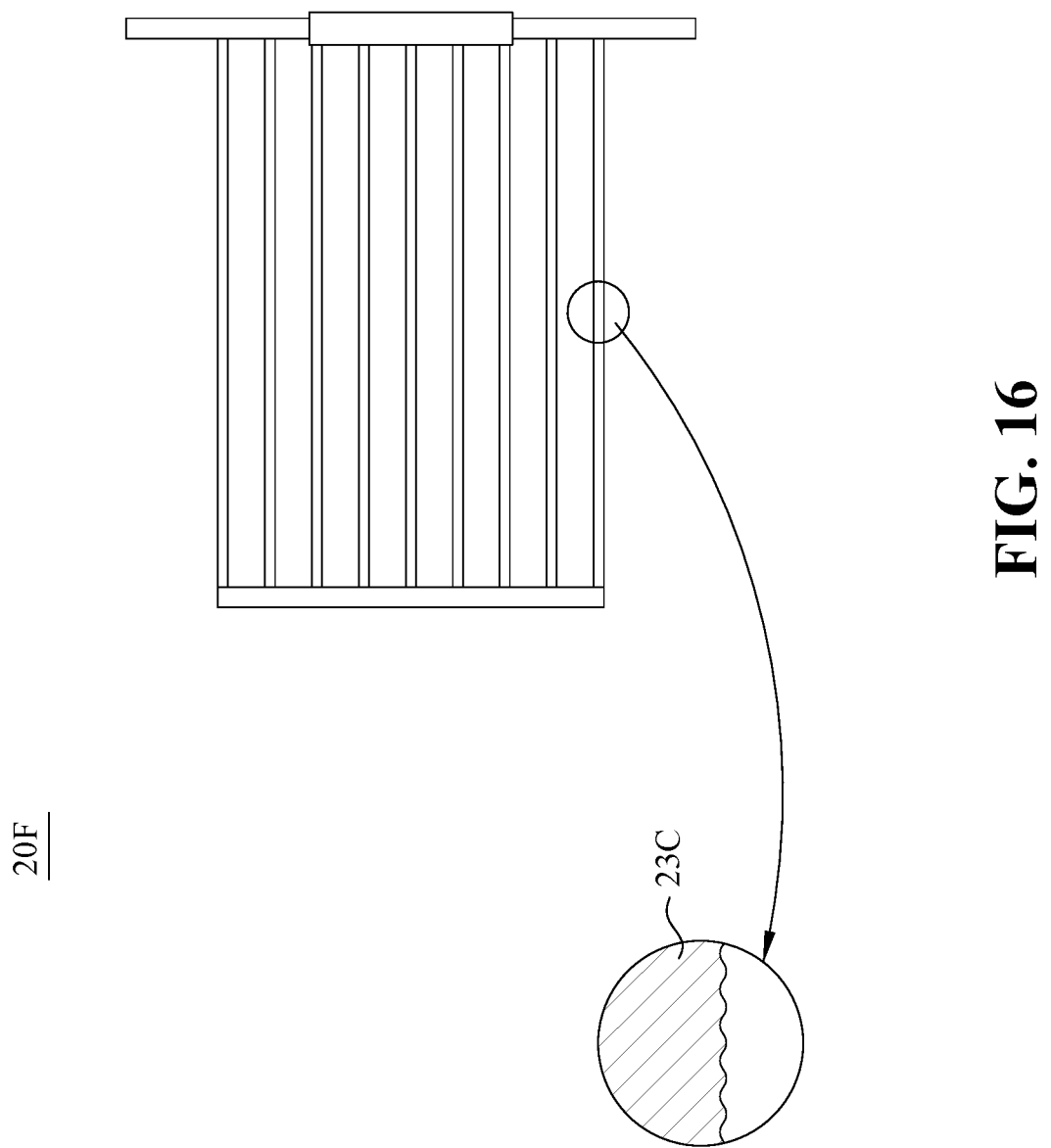
FIG. 16 is a schematic view of the support frame of a seventh embodiment of the present invention.

FIG. 16 is a schematic view of a support frame 20F according to a seventh embodiment of the present invention. As shown in FIG. 16, the difference between the seventh embodiment and the first embodiment is that the surface of each heat dissipation fin 23C has a surface roughness. In other words, the surface of each heat dissipation fin 23C is relatively uneven, with concavities and convexities, so that the heat dissipation area of the heat dissipation fin 23 can be increased and the heat dissipation efficiency can be improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A 5G outdoor unit having a heat dissipation function, comprising:
   a main body, further comprising a housing, a cover, and an antenna, wherein the cover is disposed on one side of the housing, and the antenna is disposed on an inner side of the cover; and
   a support frame, further comprising a first side plate, a second side plate on an opposite side of the first side plate, and a plurality of heat dissipation fins, wherein the first side plate is disposed on an outer side of the cover, the heat dissipation fins are disposed between the first side plate and the second side plate at intervals, with a channel formed between every two adjacent heat dissipation fins;
   wherein each heat dissipation fin has a first edge connected to the first side plate, a second edge connected to the second side plate and a plurality of heat dissipation blocks protruded from a surface of the heat dissipation fin at intervals between the first side plate and the second side plate, a through hole running in parallel with the surface is formed in each of the heat dissipation blocks between the heat dissipation block and the surface, and a plurality of the heat dissipation blocks are located inside the channel.

2. The 5G outdoor unit according to claim 1, wherein the first side plate has at least one groove, the cover has at least one protrusion, and the at least one protrusion is disposed in the at least one groove.

3. The 5G outdoor unit according to claim 1, wherein the first side plate has at least one protrusion, the cover has at least one groove, and the at least one protrusion is disposed in the at least one groove.

4. The 5G outdoor unit according to claim 1, wherein an axis of the through hole is parallel to a flow direction of airflow through the channel.

5. The 5G outdoor unit according to claim 1, wherein the second side plate defines at least one fixing hole, and at least one fastener passes through the at least one fixing hole and fixes the second side plate to an external device.

6. The 5G outdoor unit according to claim 1, wherein each heat dissipation fin defines a plurality of via holes.

7. The 5G outdoor unit according to claim 1, wherein the surface of each heat dissipation fin has a layer of heat dissipation material.

8. The 5G outdoor unit according to claim 1, wherein the surface of each heat dissipation fin has a surface roughness.

* * * * *